United States Patent
Ohmura et al.

(10) Patent No.: US 9,297,963 B2
(45) Date of Patent: Mar. 29, 2016

(54) OPTICAL CONNECTOR FERRULE

(71) Applicant: SUMITOMO ELECTRIC INDUSTRIES, LTD., Osaka-shi, Osaka (JP)

(72) Inventors: Masaki Ohmura, Yokohama (JP); Takayuki Nakamura, Yokohama (JP); Takao Fujiki, Yokohama (JP); Tomomi Sano, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/632,082

(22) Filed: Feb. 26, 2015

(65) Prior Publication Data

US 2015/0247982 A1 Sep. 3, 2015

(30) Foreign Application Priority Data

Feb. 28, 2014 (JP) ................. 2014-038909
Feb. 28, 2014 (JP) ................. 2014-039296

(51) Int. Cl.
*G02B 6/36* (2006.01)
*G02B 6/38* (2006.01)
*G02B 6/40* (2006.01)

(52) U.S. Cl.
CPC ............ *G02B 6/3885* (2013.01); *G02B 6/3644* (2013.01); *G02B 6/3652* (2013.01); *G02B 6/3839* (2013.01); *G02B 6/3865* (2013.01)

(58) Field of Classification Search
CPC .. G02B 6/3644; G02B 6/3652; G02B 6/3885; G02B 6/3865; G02B 6/3839
USPC .................. 385/14–24, 76–88, 147
See application file for complete search history.

(56) References Cited

U.S. PATENT DOCUMENTS

2006/0115217 A1 6/2006 Childers et al.
2007/0297726 A1 12/2007 Childers et al.

FOREIGN PATENT DOCUMENTS

| JP | 2003-315617 A | 11/2003 |
|----|---------------|---------|
| JP | 2004-037844 A | 2/2004 |
| JP | 2004-062100 A | 2/2004 |
| JP | 4200900 B2 | 12/2008 |
| JP | 4293284 B2 | 7/2009 |

*Primary Examiner* — Akm Enayet Ullah
(74) *Attorney, Agent, or Firm* — Drinker Biddle & Reath LLP

(57) ABSTRACT

An optical connector ferrule having a front end, a rear end, an upper surface, and a lower surface includes a window opening on the upper surface, a plurality of fiber holes passing through a portion between the front end and the window along a first direction and including small diameter portions on the front end side and large diameter portions on the window side, and fiber grooves extending from the large diameter portions along the first direction and having openings in a third direction, in which the plurality of fiber holes include a first fiber hole row arranged in a second direction on a lower surface side, and a second fiber hole row arranged in the second direction on the upper surface side, and the large diameter portion in the second fiber hole row is longer than the large diameter portion in the first fiber hole row.

7 Claims, 16 Drawing Sheets

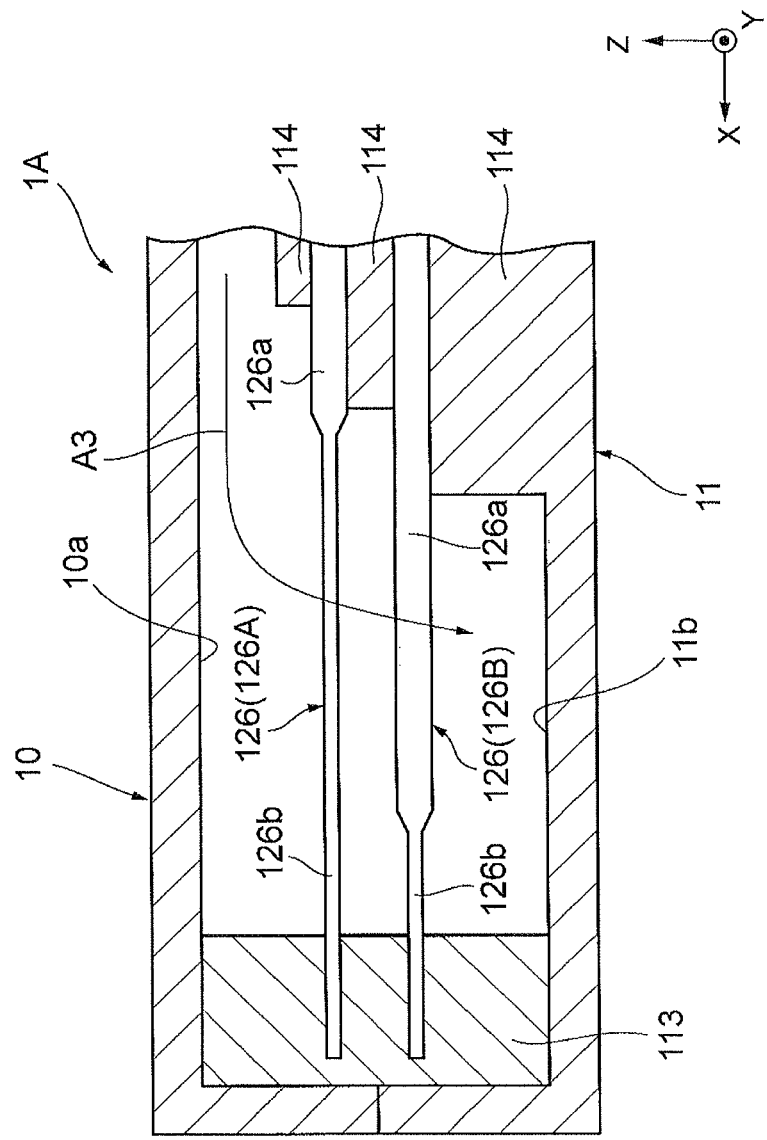

OPTICAL CONNECTOR FERRULE

BACKGROUND OF THE INVENTION

1. Field of the Invention

The present invention relates to an optical connector ferrule.

2. Related Background Art

Japanese Patent No. 4200900 discloses a mold for producing an optical connector ferrule. In the mold, an intermediate mold having pins for forming plural fiber holes is disposed between an upper mold and a lower mold. An optical connector ferrule having plural fiber holes can be obtained by injecting a resin into the mold and solidifying the resin.

SUMMARY

When an optical connector ferrule is produced using a mold in which pins are arranged inside as described above, in a step of solidifying a resin, the resin shrinks and thus the pins are sometimes inclined. In this case, the fiber holes of the optical connector ferrule may also be inclined. FIG. 15 shows a side cross section of an optical connector ferrule 100. As shown in FIG. 15, compared to fiber holes 102 and 104 before the resin is solidified indicated by a two-dot line, fiber holes 102 and 104 after the resin is solidified indicated by a solid line tend to be inclined to the center (in the directions of arrows A1 and A2).

FIG. 16 is an enlarged view of the fiber holes 104 near an end surface 100a of the optical connector ferrule 100. The end surface 100a is sometimes polished so as to be inclined at a predetermined angle (for example, 8°). If the fiber holes 104 are inclined from a normal direction of the end surface 100a before polishing, the opening positions of the fiber holes 104 on the end surface 100a are shifted by polishing.

An optical connector ferrule according to the present invention which has a front end, a rear end, an upper surface, and a lower surface, the optical connector ferrule comprises a window opening on the upper surface, a plurality of fiber holes passing through a portion between the front end and the window along a first direction and each fiber hole including a small diameter portion on the front end side and a large diameter portion on the window side, and a plurality of fiber grooves extending from each of the large diameter portions along the first direction and each fiber groove having an opening in a third direction perpendicular to the first direction, in which the plurality of fiber holes include a first fiber hole row arranged in a second direction perpendicular to the first direction and the third direction on a lower surface side, and a second fiber hole row arranged in the second direction on the upper surface side, and the large diameter portion in the second fiber hole row is longer than the large diameter portion in the first fiber hole row.

BRIEF DESCRIPTION OF THE DRAWINGS

FIG. 9 is a cross-sectional view taken along the XZ plane for explaining the flow of a resin in a cavity of the mold.

DESCRIPTION OF THE EMBODIMENTS

Figure 1:
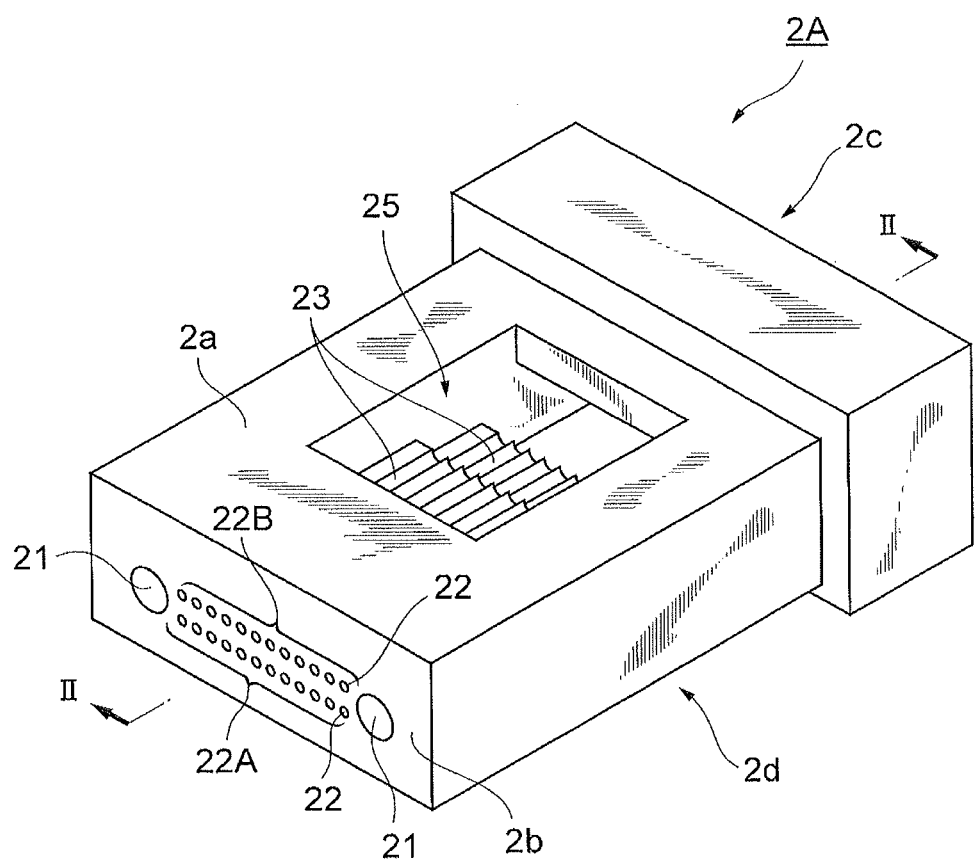
FIG. 1 shows an optical connector ferrule according to an embodiment.

Specific examples of a method of producing an optical connector ferrule, an optical connector ferrule, and a mold for producing an optical connector ferrule according to an embodiment will be described with the following drawings. The present invention is not limited to these examples and it is intended that the scope of the invention be defined by the scope of the claims and include all modifications within the equivalent meaning and scope of the claims. In the following description, the same reference numerals denote the same parts throughout the drawings, and a repeated explanation will be omitted.

First Embodiment

Figure 2:
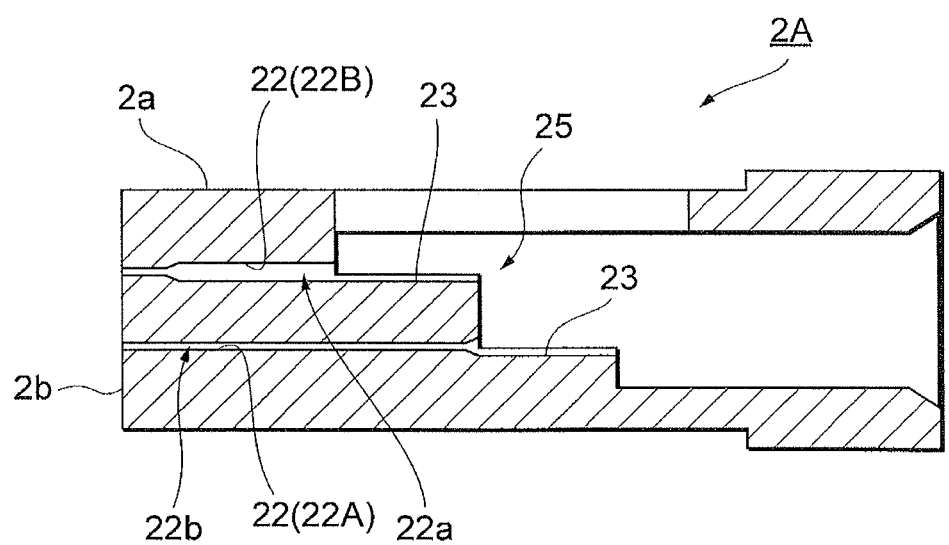
FIG. 2 is a cross-sectional view taken along line II-II of the optical connector ferrule shown in FIG. 1.

FIG. 1 shows an optical connector ferrule 2A. FIG. 2 is a cross-sectional view of the optical connector ferrule 2A shown in FIG. 1 taken along line II-II. To facilitate the comprehension of the explanation, an XYZ orthogonal coordinate system is shown in the drawings. An X-axis represents a first direction which is a longitudinal direction of the optical connector ferrule 2A, a Y-axis represents a second direction which is a width direction of the optical connector ferrule 2A. A Z-axis represents a third direction which is a height direction of the optical connector ferrule 2A.

As shown in FIGS. 1 and 2, the optical connector ferrule 2A has a front end 2b, a rear end 2c, an upper surface 2a, and a lower surface 2d. The upper surface 2a extends along the XY plane. The front end 2b extends along the YZ plane and contacts with another optical connector ferrule to be connected. The optical connector ferrule 2A has two guide holes 21 into which guide pins are inserted, and a plurality of fiber holes 22 (24 holes in the embodiment) which are disposed between the two guide holes 21. The two guide holes 21 and each of the fiber holes 22 extend along the X-axis direction from the front end 2b side to the rear end 2c side of the optical connector ferrule, and open to the front end 2b. Each fiber hole 22 includes a large diameter portion 22a on a window 25 side, and a small diameter portion 22b on the front end 2b side. A plurality of fiber grooves 23 are provided in the rear end side of the fiber hole 22. The fiber groove 23 extends along the X direction from the large diameter portion 22a of the fiber hole 22. The window 25 is formed on the upper surface 2a and passes through the fiber hole 22 and the rear end 2c. The fiber hole 22 passes through a portion between the front end 2b and the window 25. An optical fiber is inserted from the rear end 2c, guided by the fiber groove 23, and inserted into the optical fiber hole 22. In this state, the optical fiber is fixed by an adhesive injected from the window 25.

The plural fiber holes 22 constitute a first fiber hole row 22A on the lower surface 2d side and a second fiber hole row 22B on the side close to the upper surface 2a. The first fiber hole row 22A and the second fiber hole row 22B include the plural fiber holes 22 arranged in the Y direction.

Figure 3A:
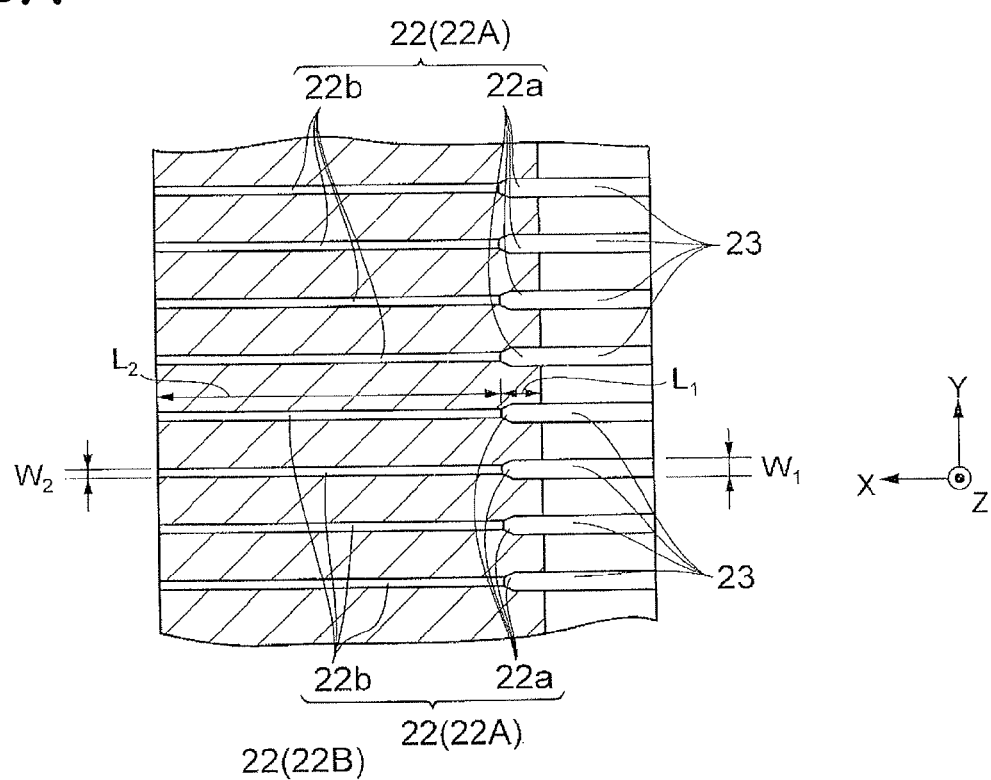
FIG. 3A is an enlarged view showing some of fiber holes included in a first fiber hole row.
Figure 3B:
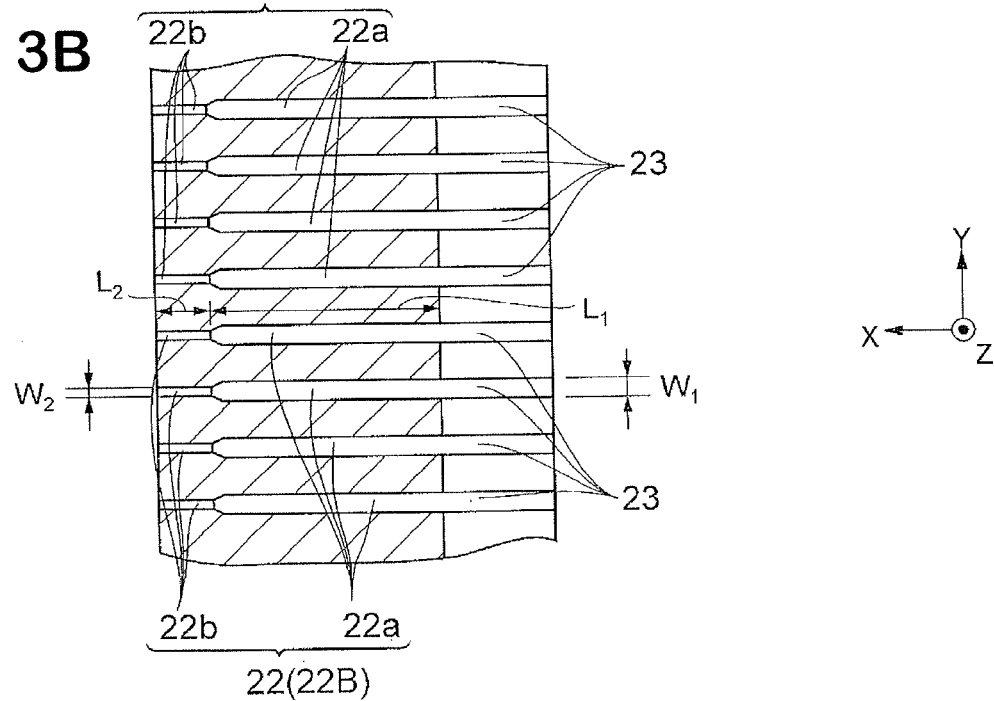
FIG. 3B is an enlarged view showing some of fiber holes included in a second fiber hole row.

FIG. 3A is a cross-sectional view taken along the XY plane of the first fiber hole row 22A. FIG. 3B is a cross-sectional view taken along the XY plane of the second fiber hole row 22B. Each fiber hole 22 includes a large diameter portion 22a having inner diameter $W_1$, and a small diameter portion 22b having inner diameter $W_2$ ($W_2<W_1$). The large diameter portion 22a is positioned on the rear end 2c side (side close to the window 25). The small diameter portion 22b is positioned on the front end 2b side. The length $L_1$ of the large diameter portion 22a of the fiber hole 22 included in the first fiber hole row 22A is shorter than the length $L_1$ of the large diameter portion 22a of the fiber hole 22 included in the second fiber hole row 22B. Accordingly, a ratio ($L_1/L_2$) between the length $L_1$ of the large diameter portion 22a and the length $L_2$ of the small diameter portion 22b of the fiber hole 22 included in the first fiber hole row 22A is smaller than a ratio ($L_1/L_2$) in the second fiber hole row 22B. Thus, a value obtained by averaging the inner diameter of each fiber hole 22 included in the first fiber hole row 22A in an X direction (hereinafter, referred to as a first average value) is smaller than a value obtained by averaging the inner diameter of each fiber hole 22 included in the second fiber hole row 22B in the X direction (hereinafter, referred to as a second average value).

Figure 4:
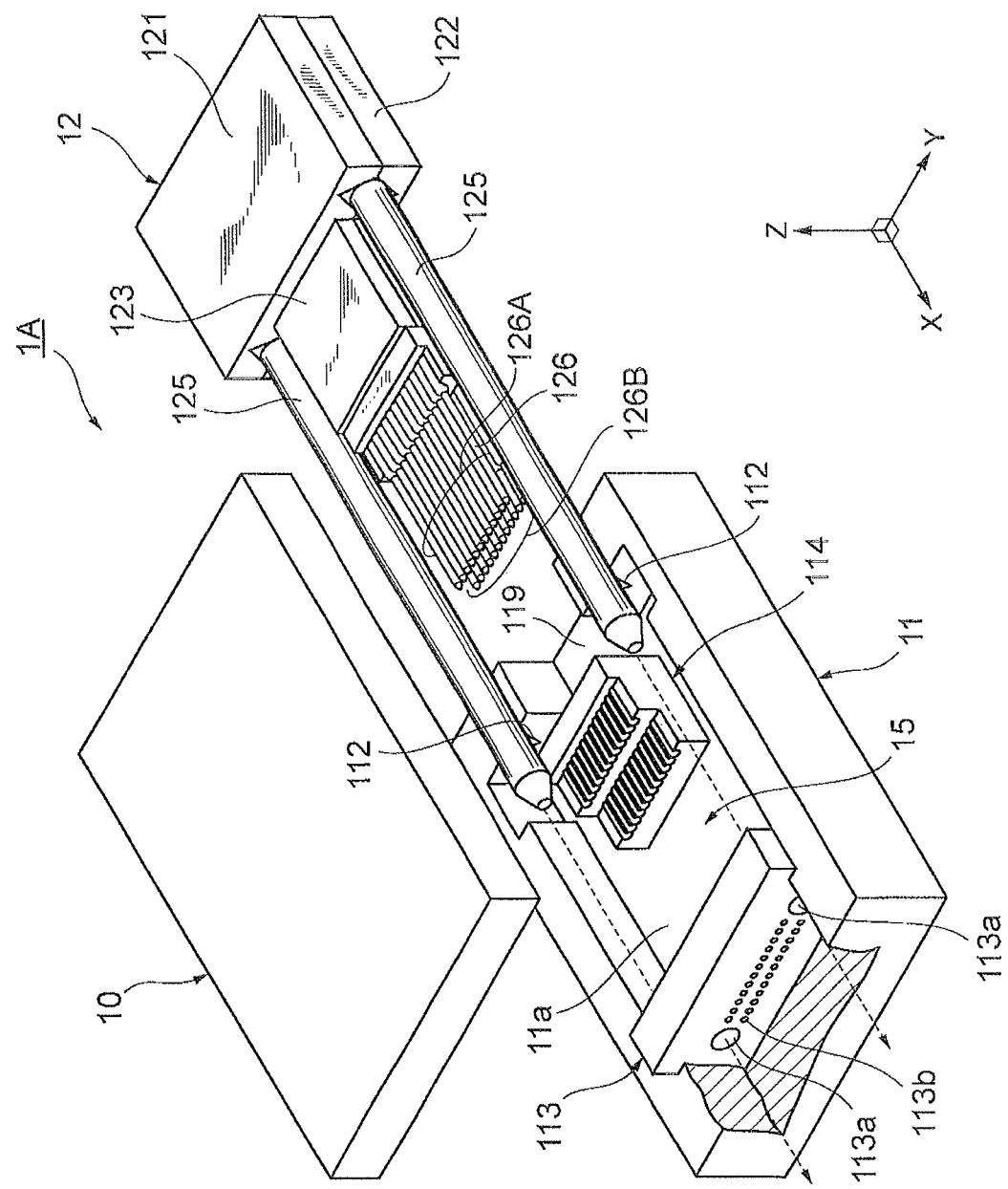
FIG. 4 shows a mold.
Figure 5:
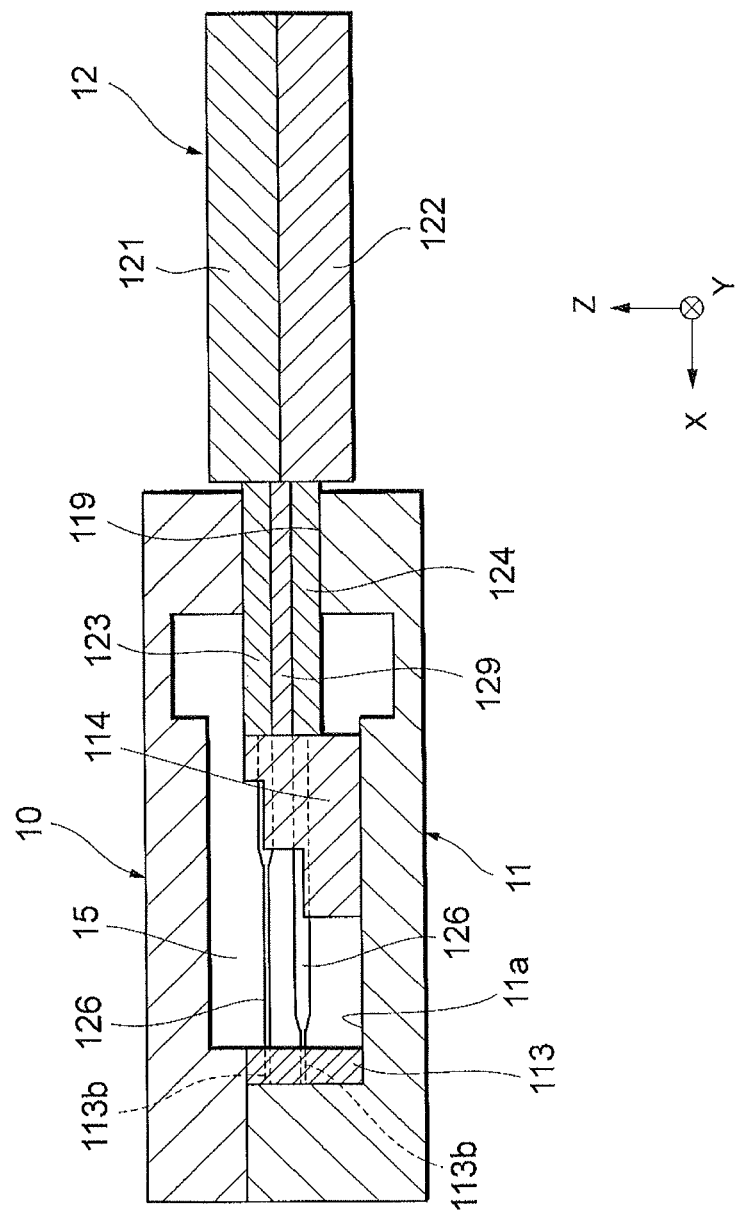
FIG. 5 is a cross-sectional view taken along the XZ plane of the mold.
Figure 6:
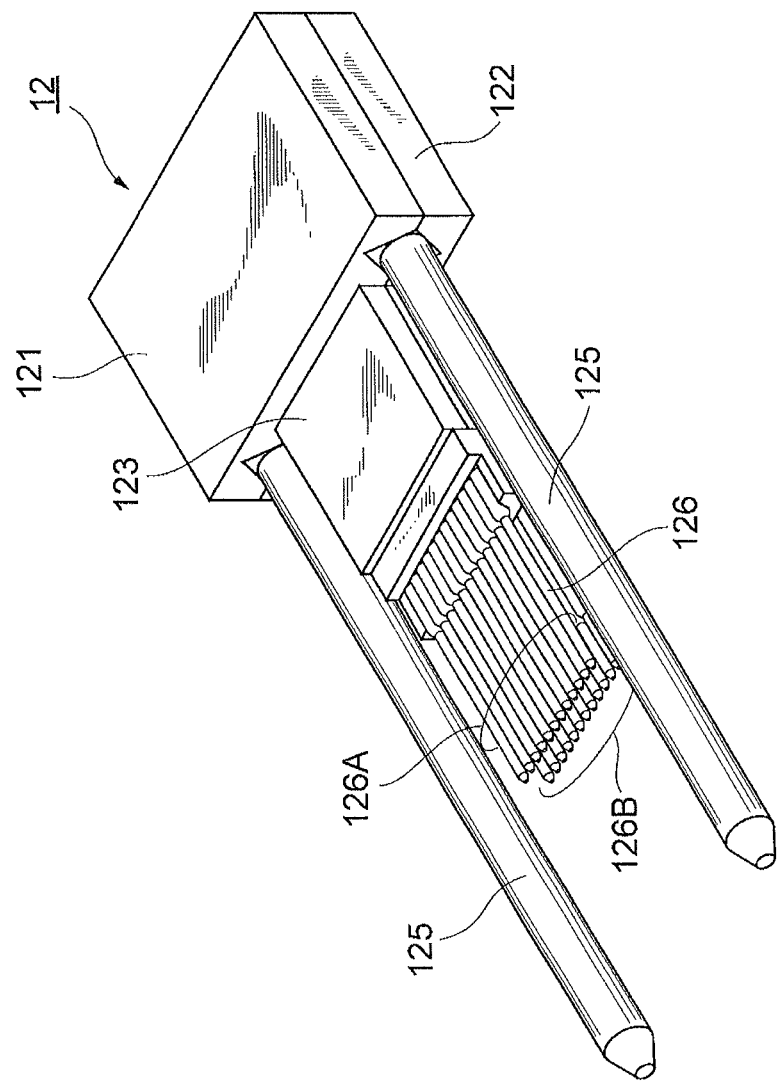
FIG. 6 shows an intermediate mold.

FIG. 4 is an exploded perspective view showing a mold 1A used for producing the above-described optical connector ferrule 2A. FIG. 5 is a cross-sectional view taken along the XZ plane of the mold 1A. FIG. 6 is a perspective view showing an intermediate mold 12 of the mold 1A.

The mold 1A includes an upper mold (first mold) 10, a lower mold (second mold) 11, and an intermediate mold 12. The upper mold 10 and the lower mold 11 define a cavity 15 and the intermediate mold 12 is disposed in the cavity 15. The lower mold 11 has a bottom surface 11a which defines the cavity 15. The intermediate mold 12 includes two guide hole pins 125 for forming the guide holes 21 of the optical connector ferrule 2A. Plural fiber hole pins 126 for forming the fiber holes 22 of the optical connector ferrule 2A are disposed between the two guide hole pins 125. The rear ends of the guide hole pins 125 and the fiber hole pins 126 are held by a pair of holding members 121 and 122. The rear end of the fiber hole pins 126 is further held by an upper holding member 123, a lower holding member 124, and a spacer 129 which are thinner than the holding members 121 and 122. The upper holding member 123, the lower holding member 124, and the spacer 129 are held by the holding members 121 and 122. The holding members 121 and 122 are fixed to each other by screwing.

The plural fiber hole pins 126 forms a first pin row 126A and a second pin row 126B. The first pin row 126A and the second pin row 126B include the plural fiber hole pins 126 arranged in the Y direction. The first pin row 126A forms the first fiber hole row 22A of the optical connector ferrule 2A. The second pin row 126B forms the second fiber hole row 22B.

At the rear end of the lower mold 11, two V-grooves 112 for positioning the respective two guide hole pins 125 are formed. A recess 119 for housing the upper holding member 123, the lower holding member 124, and the spacer 129 is formed between the two V-grooves 112. A pin holding member 113 is disposed at the tip end of the lower mold 11. Two insertion holes 113a for fixing the respective tip ends of the two guide hole pines 125, and insertion holes 113b for fixing the respective tip ends of the fiber hole pins 126 are formed in the pin holding member 113.

Figure 7:
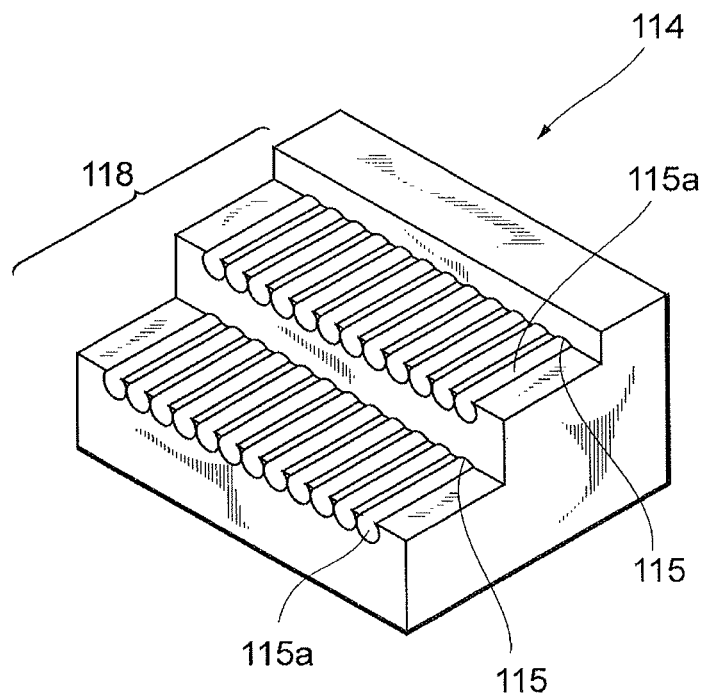
FIG. 7 shows a protrusion.

A protrusion 114 for forming the window 25 of the optical connector ferrule 2A is provided at the center of the bottom surface 11a of the lower mold 11. As shown in FIG. 7, the protrusion 114 includes insertion holes 115 for accommodating the respective rear ends of each of the fiber hole pins 126. A step 118 is formed at the tip end side of the upper end of the protrusion 114. In the step 118, the tip end side of the insertion hole 115 is formed into a C-shaped groove 115a and the upper portion (Z direction) is opened.

Figure 8A:
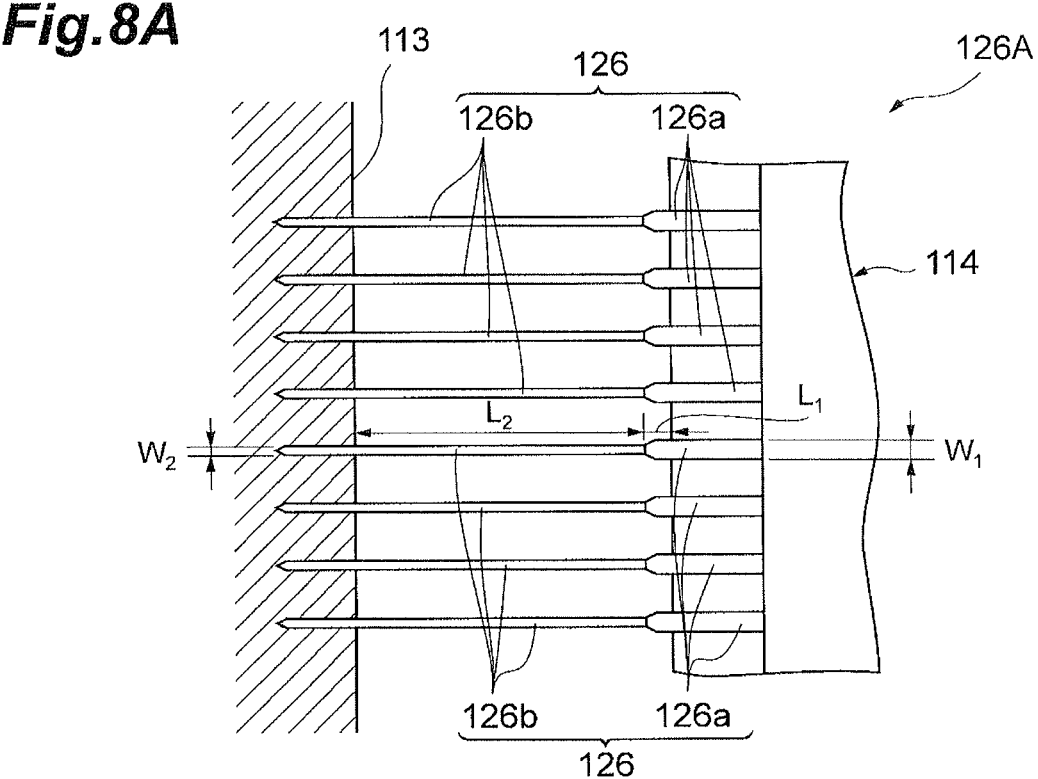
FIG. 8A is an enlarged view showing some of fiber hole pins included in a first pin row.
Figure 8B:
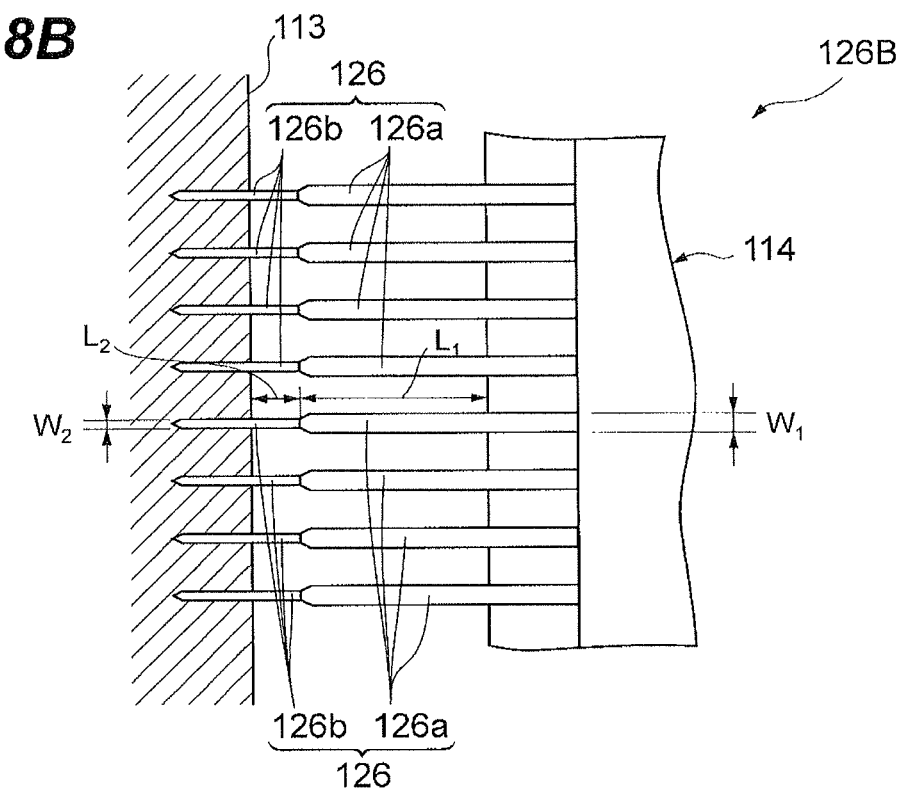
FIG. 8B is an enlarged view showing some of fiber hole pins included in a second pin row.

FIG. 8A is a cross-sectional view taken along the XY plane of the fiber hole pins 126 included in the first pin row 126A. FIG. 8B is a cross-sectional view taken along the XY plane of the fiber hole pins 126 included in the second pin row 126B.

The fiber hole pin 126 includes a large diameter portion 126a having outer diameter $W_1$ and a small diameter portion 126b having outer diameter $W_2$ ($W_2<W_1$). The large diameter portion 126a is positioned on the rear end side and the small diameter portion 126b is positioned on the front end side. The length of a portion protruding from the protrusion 114 in the large diameter portion 126a of the fiber hole pin 126 is set to $L_1$ and the length of a portion protruding from the pin holding member 113 in the small diameter portion 126b is set to $L_2$.

The length $L_1$ in the first pin row 126A is shorter than the length $L_2$ in the second pin row 126B. The ratio ($L_1/L_2$) of the first pin row 126A is smaller than the ratio ($L_1/L_2$) of the second pin row 126B. Accordingly, a value obtained by averaging the outer diameter of each fiber hole pins 126 included in the first pin row 126A in the X direction (hereinafter, referred to as a first average width) is smaller than a value obtained by averaging the outer diameter of each fiber hole pins 126 included in the second pin row 126B in the X direction (hereinafter, referred to as a second average width).

A method of producing the optical connector ferrule 2A using the mold 1A will be described. First, the guide hole pins 125 and the fiber hole pins 126 are held by the holding members 121 and 122 to form the intermediate mold 12. Then, the guide hole pins 125 are inserted into the insertion holes 113a of the pin holding member 113. The fiber hole pins 126 are further inserted into the insertion holes 115 of the protrusion 114 and the insertion holes 113b of the pin holding member 113. In this state, the intermediate mold 12 is fixed to the lower mold 11. The upper mold 10 and the lower mold 11 are assembled to form the cavity 15.

A resin (for example, polyphenylene sulfide) is injected into the cavity 15 and solidified. Then, the intermediate mold 12 is pulled out and the upper mold 10 and the lower mold 11 are opened, whereby the optical connector ferrule 2A is obtained.

The flow of the resin injected into the cavity 15 will be described. FIG. 9 is a cross-sectional view taken along the XZ plane of the mold 1A and FIG. 10 is an enlarged view thereof. Since the resin injected into the cavity 115 flows along the bottom surface 11a of the lower mold 11 and is interrupted by the protrusion 114, the flow of the resin along the bottom surface 11a is slower than the flow of the resin along a surface 10a of the upper mold 10 which is opposite to the bottom surface 11a. As a result, the resin flows from the surface 10a to the fiber hole pins 126 as indicated by the arrow A3. At this time, as the first average width and the second average width are small, the force applied to the fiber hole pins 126 is decreased and thus the fiber hole pins 126 may not be likely to be bent with respect to the flow of the resin. On the other hand, as the first average width and the second average width are large, the force applied to the fiber hole pins 126 is increased and thus the fiber hole pins 126 may be likely to be bent with respect to the flow of the resin.

Figure 10A:
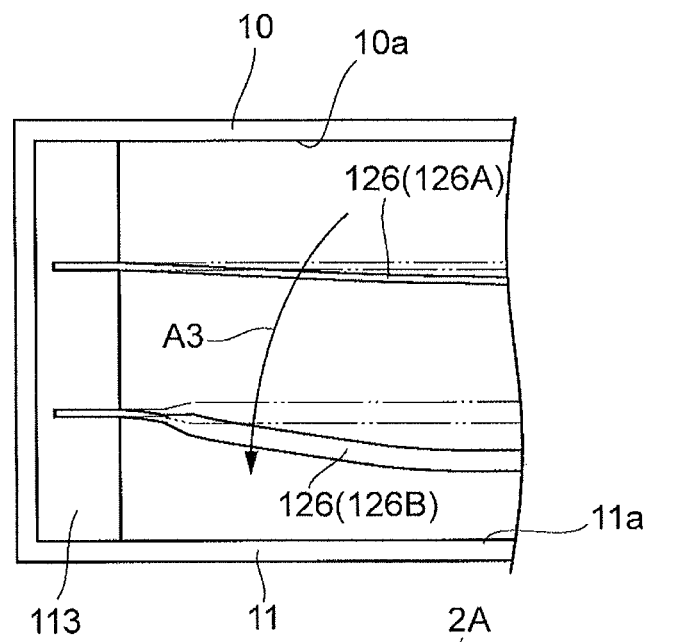
FIGS. 10A and 10B are enlarged views explaining the flow of a resin in the cavity.
Figure 10B:
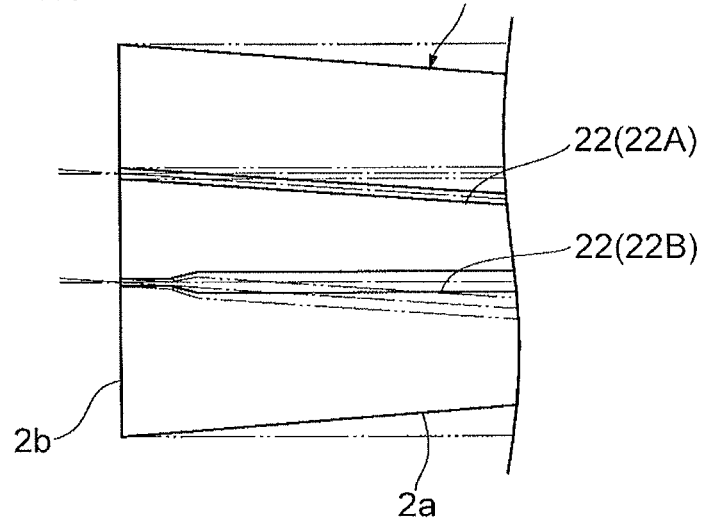
Figure 15:
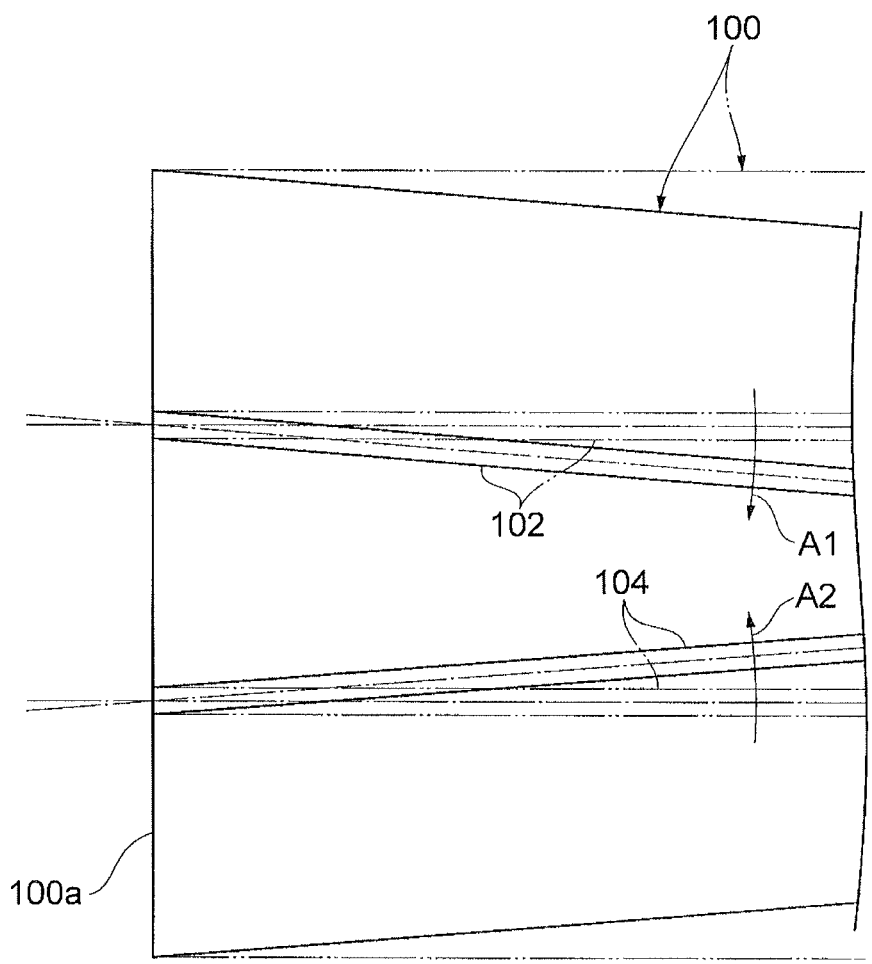
FIG. 15 is a cross-sectional view taken along the XZ plane of the optical connector ferrule.
Figure 16:
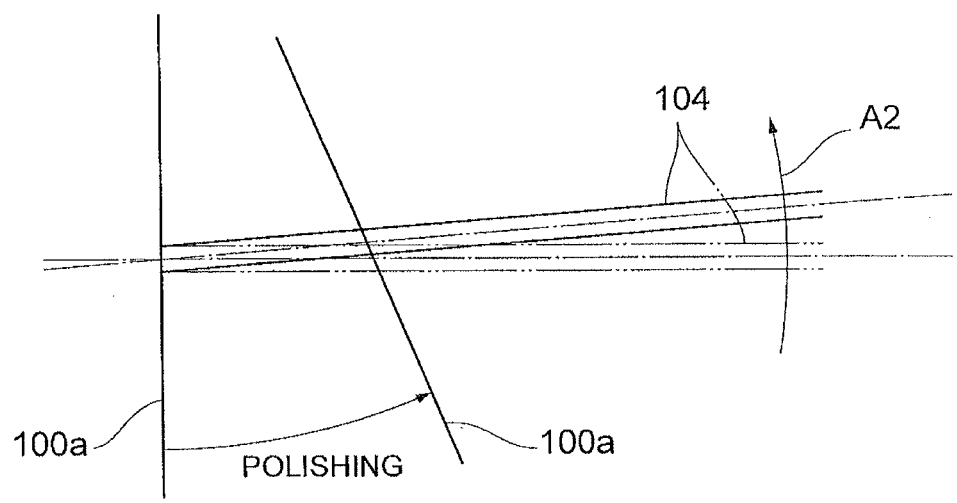
FIG. 16 is a cross-sectional view taken along the XZ plane of the fiber holes.

In the mold 1A shown in FIG. 10A, as in the example shown in FIG. 15, when the resin is solidified, the first pin row 126A is inclined to the bottom surface 11a, and the second pin row 126B is inclined to the surface 10a. On the other hand, the force by the flow A3 of the resin is applied from the surface to the bottom surface 11a.

Accordingly, in the first pin row 126A, the inclination of the first fiber hole row 22A can be suppressed by decreasing the first average width of the first pin row 126A. This is because the inclination of the first fiber hole row 22A caused by the force by the flow of the resin can be suppressed. In addition, the inclination of the second fiber hole row 22B can be suppressed by increasing the second average width of the second pin row 126B. This is because the direction of the inclination of the second fiber hole row 22B caused by the force by the flow of the resin and the solidifying of the resin are opposite to each other and both of the inclinations cancel each other.

First Modification Example

Figure 11A:
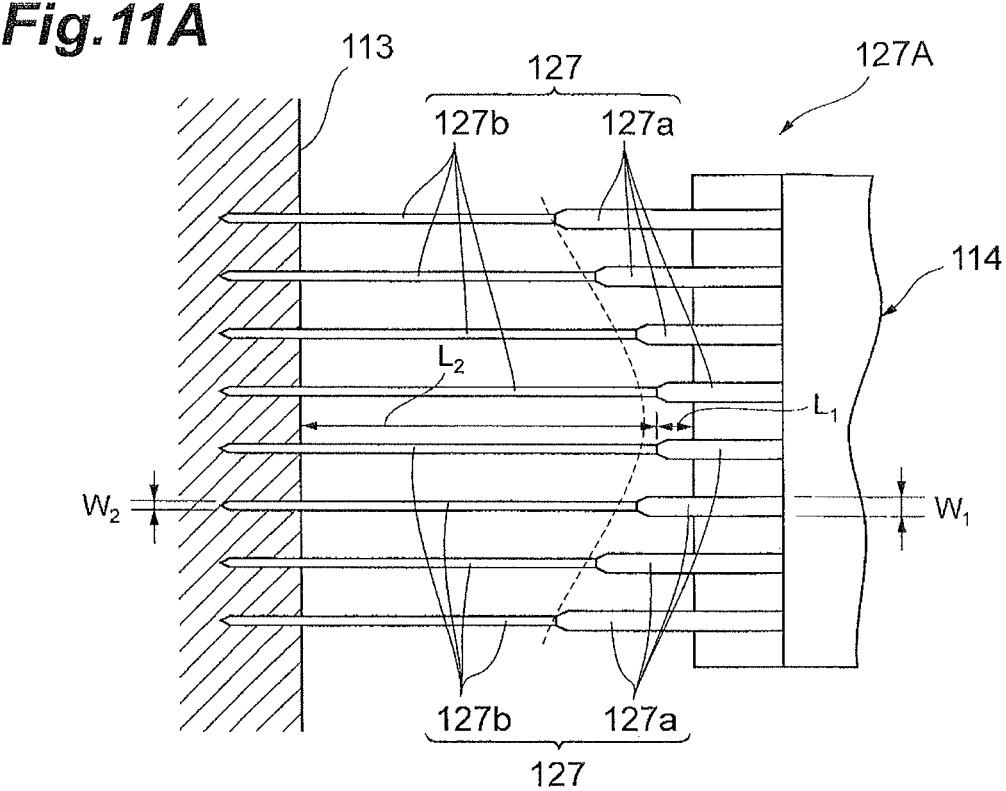
FIGS. 11A and 11B are cross-sectional views taken along the YZ plane of the optical connector ferrule.
Figure 11B:
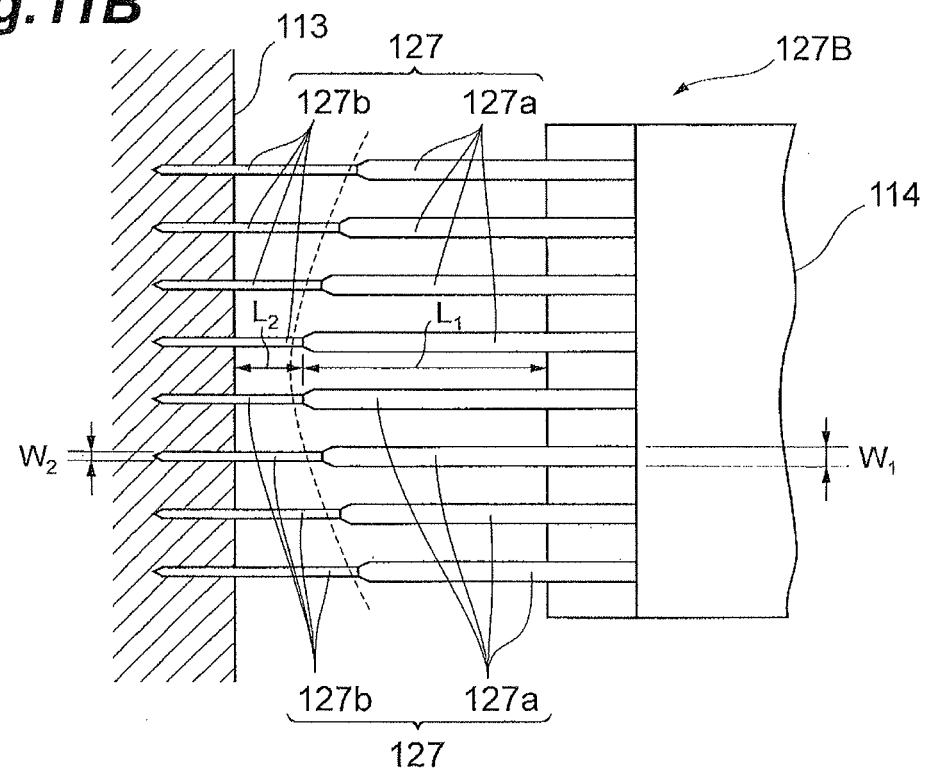

FIGS. 11A and 11B show a first modification example of the fiber hole pins 127. FIG. 11A shows a first pin row 127A and FIG. 11B shows a second pin row 127B.

The first average width of the fiber hole pins 127 positioned on the center side is smaller than the first average width of the fiber hole pins 127 positioned on the both end sides. For example, the first average width is gradually decreased from the both end sides to the center side.

On the other hand, the second average width of the fiber hole pins 127 positioned on the center side is larger than the second average width of the fiber hole pins 127 positioned on the both sides. For example, the second average width is gradually increased from the both sides to the center side.

Figure 12:
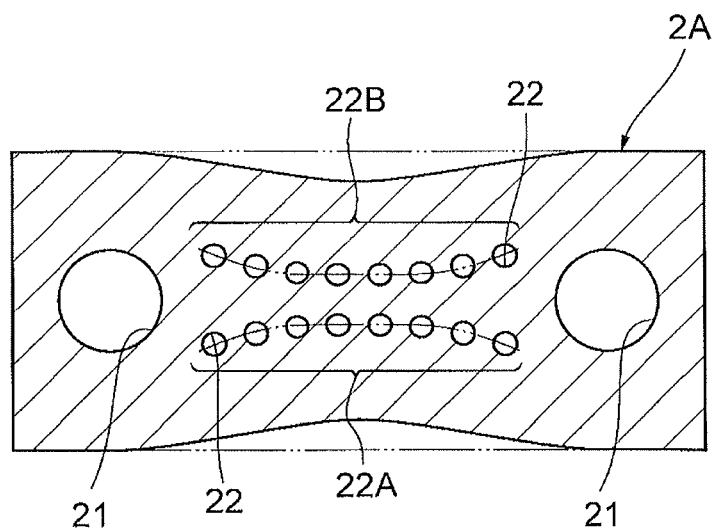
FIG. 12 shows a first modification example of the fiber hole pins.

FIG. 12 shows the front end 2b of the optical connector ferrule 2A. The two-dot line indicates the shape before the resin is solidified and the solid line indicates the shape after the resin is solidified. Since the optical connector ferrule 2A shrinks toward the center as a whole, the fiber holes 22 positioned on the center side are largely inclined compared to the fiber holes 22 positioned on the both sides of the first fiber hole row 22A and the second fiber hole row 22B. In addition, the first fiber hole row 22A is inclined to the upper direction and the second fiber hole row 22B is inclined to the lower direction.

Accordingly, in the first pin row 127A, the direction of the inclination caused by the flow of the resin and solidifying the resin is the same, and the amount of inclination on the center side is larger than the amount of inclination on the both sides of the first fiber hole row 22A. Therefore, when the first average width of the first pin row 127A on the center side is made smaller than the first average width of the first pin row on the both sides, the pins may not be likely to be bent with respect to the flow of the resin. Accordingly, unevenness in the amount of inclination of the first pin row 127A can be reduced.

On the other hand, in the second pin row 127B, the direction of the inclination caused by the flow of the resin and solidifying the resin are opposite to each other. The amount of inclination of the second fiber hole row 22B by the latter on the center side is larger than that of on the both sides. Therefore, the second pin row 127B may be likely to be bent with respect to the flow of the resin by enlarging the second average width on the center side than the both sides. Accordingly, unevenness in the amount of inclination of the second pin row 127B can be reduced.

Second Modification Example

Figure 13A:
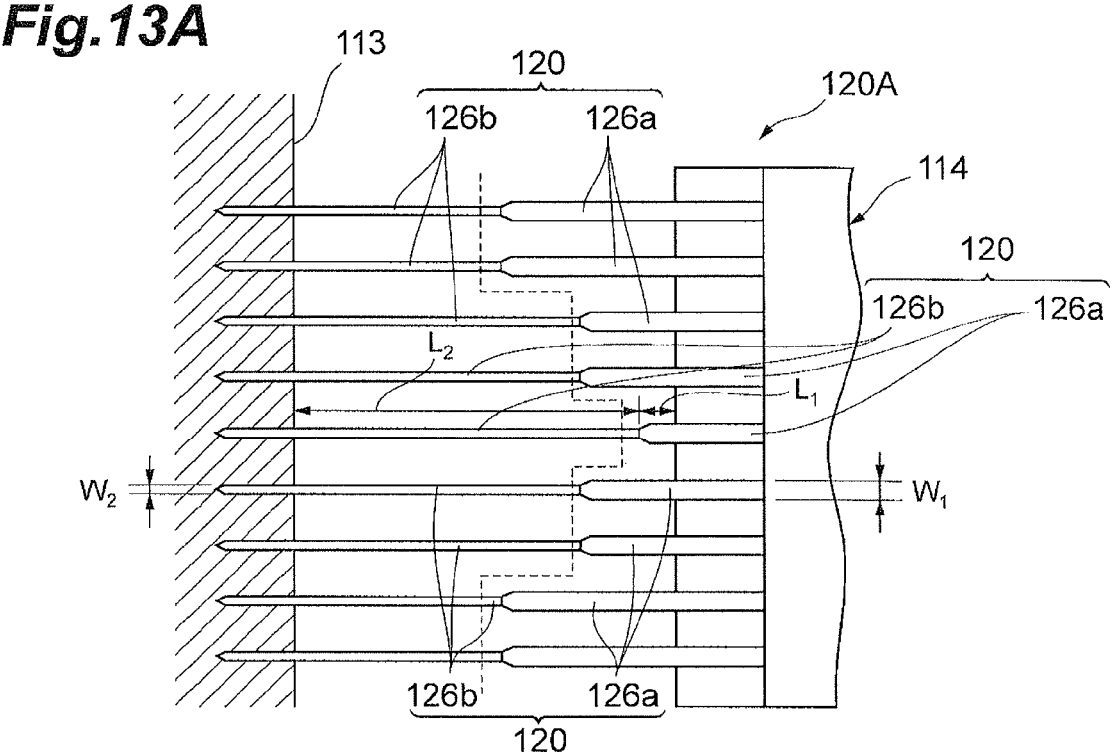
FIGS. 13A and 13B show a second modification example of the fiber hole pins.
Figure 13B:
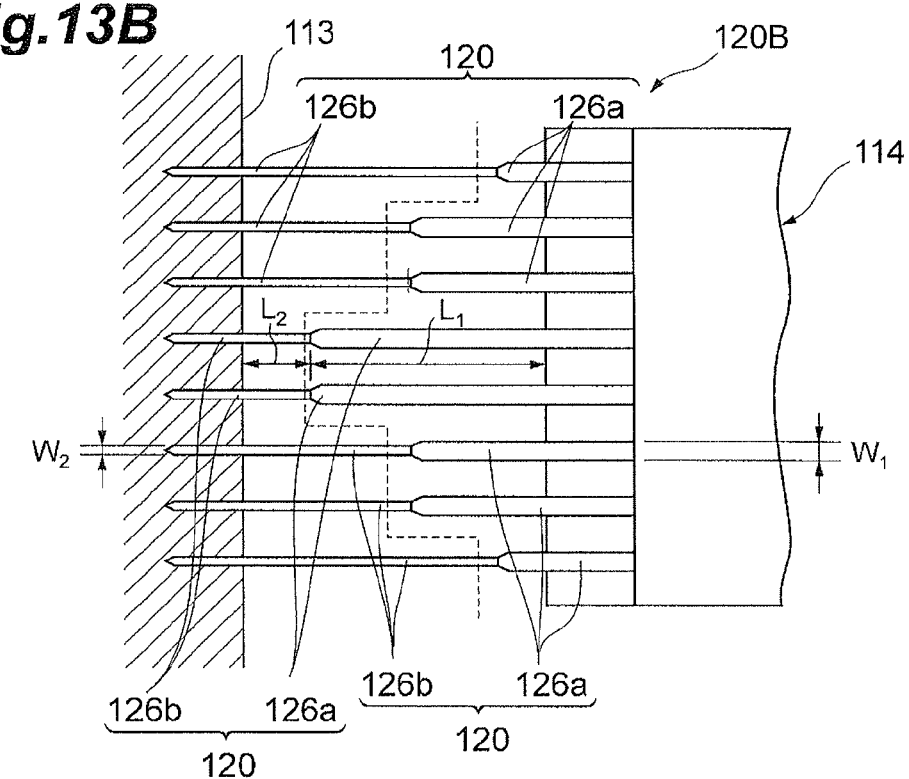

FIGS. 13A and 13B show fiber hole pins 120 according to a second modification example. FIG. 13A shows a first pin row 120A and FIG. 13B shows a second pin row 120B. FIGS. 13A and 13B are viewed from the Z direction.

As shown in FIG. 13A, the first average width of the fiber hole pins 120 included in the first pin row 120A is decreased incrementally from the both sides to the center side of the first pin row 120A in the Y direction. Further, two adjacent of the fiber hole pins 120 have almost the same second average width. In this case, as an example, two adjacent of the fiber holes 22 have the same length in the large diameter portion 22a.

As shown in FIG. 13B, the second average width of the fiber hole pins 120 included in the second pin row 120B is increased incrementally from the both sides to the center side of the second pin row 120B in the Y direction. Further, two adjacent of the fiber hole pins 120 have almost the same second average width. In this case, as an example, two adjacent of the fiber holes 22 have the same length in the large diameter portion 22a.

Third Modification Example

Figure 14A:
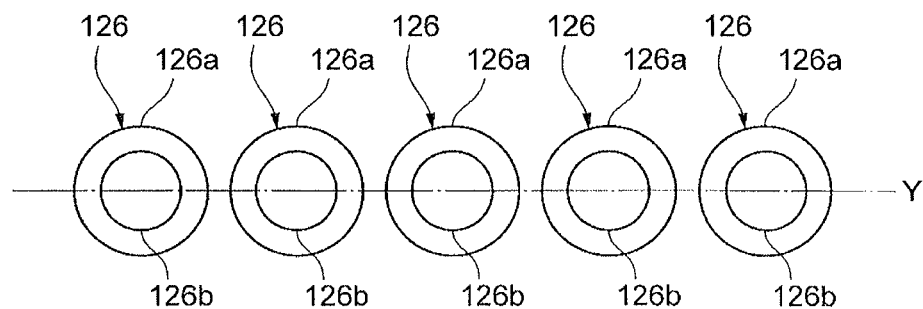
FIGS. 14A to 14C show a third modification example of the fiber hole pins.
Figure 14B:
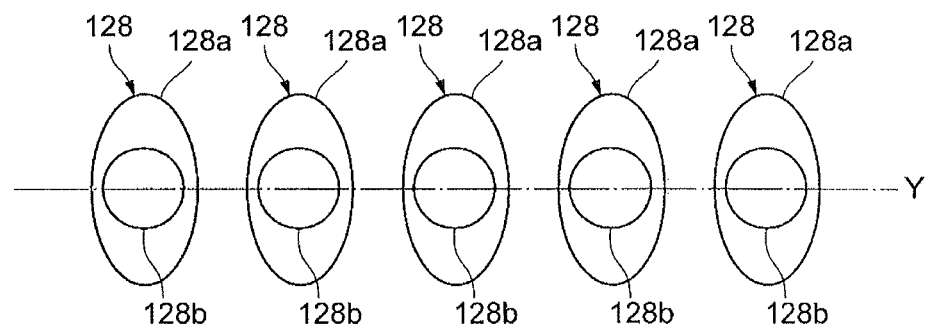
Figure 14C:
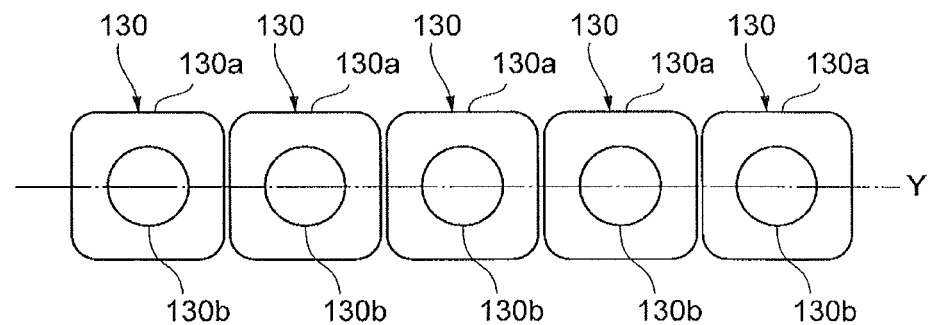

FIGS. 14A to 14C show the large diameter portions of the fiber hole pins as viewed from the X direction. In a third modification example, the fiber hole pins are not likely to be bent or are likely to be bent with respect to the flow of the resin by changing the shape of the fiber hole pins.

FIG. 14A shows the fiber hole pins 126 shown in the first embodiment and the first modification example. The cross-sectional shape of the large diameter portion 126a of the fiber hole pin 126 taken along the YZ plane is a circle.

FIG. 14B shows fiber hole pins 128 as a third modification example. The cross-sectional shape of large diameter portions 128a of the fiber hole pins 128 taken along the YZ plane is an oval having a minor axis in the Y direction. Thus, the rigidity of the fiber hole pins 128 with respect to the flow of the resin in the Z direction may be increased. Accordingly, the same effect as in a case in which the average width of the fiber hole pins 128 is decreased can be obtained. For example, the fiber hole pins 128 are preferably used in the first pin row. In the optical connector ferrule produced by the mold provided with the fiber hole pins 128, the cross-sectional shape of the large diameter portions of the fiber holes taken along the YZ plane is an oval having a minor axis in the Y direction.

FIG. 14C shows fiber hole pins 130 as the third modification example. The cross-sectional shape of the large diameter portions 130a of the fiber hole pins 130 taken along the YZ plane is substantially a rectangle having planes crossing the Z direction. Thus, the pins are likely to be affected by the flow of the resin in the Z direction and the fiber hole pins 130 may be likely to be bent. For example, the fiber hole pins 130 are preferably used in the second pin row. In the optical connector ferrule produced by the mold provided with the fiber hole pins 130, the cross-sectional shape of the large diameter portions of the fiber holes taken along the YZ plane is substantially a rectangle.

What is claimed is:

1. An optical connector ferrule which has a front end, a rear end, an upper surface, and a lower surface, the optical connector ferrule comprising:
   a window opening on the upper surface;
   a plurality of fiber holes passing through a portion between the front end and the window along a first direction and each fiber hole including a small diameter portion on the front end side and a large diameter portion on the window side; and
   a plurality of fiber grooves extending from each of the large diameter portions along the first direction and each fiber groove having an opening in a third direction perpendicular to the first direction,
   wherein the plurality of fiber holes include
      a first fiber hole row arranged in a second direction perpendicular to the first direction and the third direction on the lower surface side, and
      a second fiber hole row arranged in the second direction on the upper surface side, and
   the large diameter portion in the second fiber hole row is longer than the large diameter portion in the first fiber hole row.

2. The optical connector ferrule according to claim 1,
   wherein the first fiber hole row includes the plurality of fiber holes arranged in the second direction, and
   the length of the large diameter portion in the first fiber hole row is shorter toward the center side of the first fiber hole row.

3. The optical connector ferrule according to claim 2,
   wherein the fiber holes having the same length in the large diameter portion are provided adjacent to each other in the first fiber hole row.

4. The optical connector ferrule according to claim 1,
   wherein the second fiber hole row includes the plurality of fiber holes arranged in the second direction, and
   the length of the large diameter portion in the second fiber hole row is longer toward the center side of the second fiber hole row.

5. The optical connector ferrule according to claim 4,
   wherein the fiber holes having the same length in the large diameter portion are provided adjacent to each other in the second fiber hole row.

6. The optical connector ferrule according to claim. 1,
   wherein a cross-sectional shape in a plane including the second direction and the third direction of the large diameter portion of the second fiber hole row is an oval having a minor axis in the second direction.

7. The optical connector ferrule according to claim 1,
   wherein a cross-sectional shape in a plane including the second direction and the third direction of the large diameter portion of the first fiber hole row is a rectangle having plane crossing the third direction.

* * * * *